(12) United States Patent
Miao et al.

(10) Patent No.: US 12,377,588 B2
(45) Date of Patent: Aug. 5, 2025

(54) ROTARY INJECTION MOLD FOR ELASTIC HOUSING OF NECKBAND HEADSET AND MANUFACTURING METHOD

(71) Applicant: Dongguan Xinlianxing Electronics Co., Ltd., Guangdong (CN)

(72) Inventors: Conghui Miao, Guangdong (CN); Jie Du, Guangdong (CN)

(73) Assignee: DONGGUAN XINLIANXING ELECTRONICS CO., LTD., Dongguan (CN)

( * ) Notice: Subject to any disclaimer, the term of this patent is extended or adjusted under 35 U.S.C. 154(b) by 85 days.

(21) Appl. No.: 18/359,541

(22) Filed: Jul. 26, 2023

(65) Prior Publication Data

US 2024/0051203 A1   Feb. 15, 2024

(30) Foreign Application Priority Data

Aug. 9, 2022   (CN) .......................... 202210958504.9

(51) Int. Cl.
| | |
|---|---|
| *B29C 45/14* | (2006.01) |
| *B29C 45/26* | (2006.01) |
| *B29C 45/00* | (2006.01) |
| *B29K 83/00* | (2006.01) |
| *B29L 31/34* | (2006.01) |

(52) U.S. Cl.
CPC .... *B29C 45/2681* (2013.01); *B29C 45/14065* (2013.01); *B29C 45/14549* (2013.01); *B29C 45/14639* (2013.01); *B29C 45/2602* (2013.01); *B29C 45/0001* (2013.01); *B29K 2083/005* (2013.01); *B29L 2031/3431* (2013.01)

(58) Field of Classification Search
CPC ........................ B29C 45/2681; B29C 45/2602
See application file for complete search history.

(56) References Cited

U.S. PATENT DOCUMENTS

| | | | |
|---|---|---|---|
| 2011/0180321 A1 | 7/2011 | Aase et al. | |
| 2014/0334658 A1 | 11/2014 | Wang et al. | |

FOREIGN PATENT DOCUMENTS

| | | | |
|---|---|---|---|
| CN | 205497952 U | | 8/2016 |
| CN | 108989936 A | | 12/2018 |
| CN | 208992975 | * | 6/2019 |
| CN | 209982694 U | | 1/2020 |

(Continued)

*Primary Examiner* — Edmund H Lee
(74) *Attorney, Agent, or Firm* — SHIMOKAJI IP (57) ABSTRACT

A rotary injection mold for an elastic housing of a neckband headset includes an upper mold core and a lower mold core, the lower mold core is provided with a main installation cavity and a control end installation cavity, the main installation cavity is installed with a rotary mold core having two half-ring molding channels. When the upper mold core and the lower mold core are closed, a primary injection cavity is formed, for molding a supporting member supporting a neckband; a secondary injection cavity is formed, for molding a strip member wrapping the neckband. The control end installation cavity is provided with two control end injection molds for molding a control end elastic casing, and the control end injection cavities are hermetically communicated with the secondary injection cavity. By the invention, an integrated elastic housing is molded to wrap the neckband headset, to improve the manufacturing efficiency.

20 Claims, 7 Drawing Sheets

(56) References Cited

FOREIGN PATENT DOCUMENTS

| CN | 110757735 A | | 2/2020 |
|---|---|---|---|
| CN | 212193925 | * | 12/2020 |
| CN | 113561420 | * | 10/2021 |
| CN | 114986790 | * | 9/2022 |

* cited by examiner

ROTARY INJECTION MOLD FOR ELASTIC HOUSING OF NECKBAND HEADSET AND MANUFACTURING METHOD

FIELD OF THE INVENTION

The invention relates to a manufacturing process, in particular to a rotary injection mold for an elastic housing of a neckband headset or other products, and a manufacturing method for wrapping the product with an elastic housing.

BACKGROUND OF THE INVENTION

Neckband Bluetooth headsets may include a hard neckband or a soft neckband based on their different materials. The hard neckband is mainly made of hard plastic shell, which provides wider design space and longer service life, but leads to uncomfortable wearing experience and inconvenient storage. The soft neckband may provide a more comfortable wearing experience and convenient storage, but is limited by the current molding process. In the current molding process, the housing is only molded to the position of the neckband, and then the housing is assembled with the left and right control boxes, which has limited design space and shorter service life. Normally, good water resistance and sweat resistance are required for the applications of the neckband Bluetooth headset. The existing neckband Bluetooth headset is usually manufactured by individually molding various parts, then assembling them together, and finally sealing the connection by adhesive, to achieve waterproof and sweat resistant effect. However, the sealing effect will be reduced after long-term use, which possibly leads to disconnection between the assembled parts.

For example, Chinese patent No. CN201810299581.1 discusses a preparation process of an elastic headband with metal wire inside. In the process, twice injection moldings are performed to form an elastic housing, but this housing only covers and wraps the wire part, not the overall the headset. That is to say, it's difficult to achieve the overall packaging and wrapping of the headset to integrally form a housing, which leads to a poor waterproof and sweat resistance effect. Moreover, after the first injection in the first mold core, it's necessary to remove the first semi-finished product, and then place the wires and cables into the first semi-finished product, which are together placed into the second mold core to proceed with the second injection. Therefore, it's likely to cause the deformation and curling of the first semi-finished product when it's removed from the first mold core, which results in a poor final finished product, such a product may has a poor using experience when the housing is made of TPU, TPE, PVC or EVA harder than silicone or silicone rubber.

Therefore, there is an urgent need for an injection mold for neckband headset and a manufacturing method, to solve the above problems.

SUMMARY OF THE INVENTION

An objective of the present invention is to provide a rotary injection mold for an elastic housing of a neckband headset and a manufacturing method, which achieves an integrated wrapping of the headset including the wire part and the control end part, and has good waterproof and sweat resistance effect and high manufacturing efficiency.

To achieve the above objective, the present invention provides a rotary injection mold for an elastic housing of a neckband headset, including an upper mold core and a lower mold core, wherein the lower mold core is provided with a main installation cavity and a control end installation cavity, the main installation cavity is installed with a rotary mold core, the rotary mold core is provided with two half-ring molding channels which are symmetrical with a rotation axis thereof, and the two half-ring molding channels are rotatable and positioned between a first injection position and a second injection position; the upper mold core is provided with a first upper mold core and a second upper mold core; when the upper mold core and the lower mold core are closed, a primary injection cavity is formed between the first upper mold core and the half-ring molding channel at the first injection position, by which a supporting member supporting a neck of the neckband headset is molded; a secondary injection cavity is formed between the second upper mold core and the half-ring molding channel at the second injection position, by which a strip member wrapping the neck of the neckband headset is molded; the control end installation cavity is configured to install two control end injection molds, and each of the control end injection cavities is respectively provided with a control end injection cavity by which a control end elastic casing for wrapping an insulation shell of a headset controller is molded; two control end injection cavities are hermetically communicated with the secondary injection cavity through a neck channel, so that the control end elastic casing and the strip member are molded together to integrally form an elastic housing that completely wraps the neckband headset.

As a preferable embodiment, the control end injection mold includes a first mold, a second mold mated with the first mold to form the control end injection cavity, and an mold insert installed in the control end injection cavity and corresponding to an opening of the insulation shell of a headset controller; a first hole for allowing a headset wire to pass through is formed on the first mold, and a second hole is formed on the mold insert and communicated with the first hole.

As a preferable embodiment, the elastic housing is made of silicone or silicone rubber, and the rotary injection mold is an LSR injection mold.

As a preferable embodiment, a spacer wall is formed between the control end injection cavity and the secondary injection cavity, the neck channel is formed on the spacer wall, and the spacer wall is connected with the half-ring molding channel at the second injection position and the control end injection cavity, As a preferable embodiment, the rotary mold core is provided with two positioning tables which are symmetrical with the rotation axis, and the two half-ring molding channels are formed on the two positioning tables respectively; the upper mold core is provided with two positioning grooves matched with the positioning tables respectively, and the first upper mold core and the second upper mold core are respectively formed in the two positioning grooves.

As a preferable embodiment, the first upper mold core is a half-ring protrusion corresponding to a shape of the half-ring molding channel, and a cross-section of the half-ring protrusion is semi-circular, and a diameter length of the cross-section of the half-ring protrusion is less than a diameter length of a cross-section of the half-ring molding channel; and the second upper mold core is a molding channel shaped and sized same as the half-ring molding channel.

As a preferable embodiment, the upper mold core is further provided with a positioning cavity corresponding to a position of the control end installation cavity, and a positioning block is formed in the positioning cavity to position the two control end injection molds.

As a preferable embodiment, the rotary mold core is configured to be lifted or lowered relative to the main installation cavity to detach from or enter the main installation cavity, and the main installation cavity is a non-circular cavity.

As a preferable embodiment, the mold further includes a driving plate connected with a rotating shaft of the rotary mold core and an actuator to drive the driving plate.

The present invention further provides a manufacturing method of a neckband headset with an elastic housing using the rotary injection mold mentioned above. The method includes installing the rotary mold core in the main installation cavity; closing the upper mold and the lower mold, and injecting and molding in the primary injection cavity to form a supporting member for supporting a neck of the neckband headset; splitting the upper mold and the lower mold, rotating and repositioning the rotary mold core into the lower mold core so that the half-ring molding channel at the first injection position is rotated and positioned to the second injection position, the half-ring molding channel at the second injection position is rotated and positioned to the first injection position, and the supporting member then moves to the second injection position; assembling a shaping strip, a headset wire, together with two insulation shells of headset controller to form a wrapped body, with the two insulation shells of headset controller being installed at both ends of the headset wire; installing the headset wire connected with the shaping strip into a half-ring supporting area of the supporting member at the second injection position, installing the two insulation shells of headset controller by using the control end injection mold, and installing the control end injection mold equipped with the insulation shells in the control end installation cavity; and closing the upper mold and the lower mold, injecting and molding in the secondary injection cavity and the control end injection cavity, so as to integrally form an elastic housing wrapping the wrapped body by one-time injection, the elastic housing including the supporting member, the strip member wrapping the neck of the neckband headset, and the control end elastic casing integrally connected with the strip member and the supporting member and wrapping the headset controller.

In comparison with the prior art, an integrated elastic housing is molded in the present invention, to realize the integrated wrapping of the neckband headset, therefore the neckband headset according to the present invention has good waterproof and sweat resistant effect.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

In order to describe the technical content, structural features, achieved objects and effects of the present invention in detail, the following detailed description is given in conjunction with the embodiments and the accompanying drawings.

Referring to FIGS. 1-8, a rotary injection mold 100 of the present invention includes an upper mold 1, a lower mold core 2, an upper mold core 10 formed in the upper mold 1, and a lower mold core 20 formed in the lower mold 2. The lower mold core 20 is provided with a main installation cavity 21 and a control end installation cavity 22. A rotary mold core 30 is installed in the cavity 21, and two half-ring molding channels 32 arranged symmetrically with a rotation axis are provided on the rotary mold core 30, and the two half-ring molding channels 32 are rotatable and positioned between a first injection position 211 and a second injection position 212. The upper mold core 10 is provided with a first upper mold core 11 and a second upper mold core 12 which respectively corresponds with the first injection position 211 and the second injection position 212. When the upper mold 1 and the lower mold 2 are closed, a primary injection cavity 201 is formed between the first upper mold core 11 and the half-ring molding channel 32 at the first injection position 11, by which a supporting member for supporting a neck of the neckband headset is molded. A secondary injection cavity 202 is formed between the second upper mold core 12 and the half-ring molding channel 32 at the second injection position 212, by which a strip member 51 wrapping the neck of the neckband headset is molded. The control end installation cavity 22 is configured to install two control end injection molds 200 each of which is respectively formed with a control end injection cavity 201, by which a control end elastic casing 52 for wrapping an insulation shell 44 of a headset controller is molded. The two control end injection molding cavities 201 are hermetically communicated with the secondary injection cavity 202 through the neck channels 231 for allowing the neck to pass, so that the control end elastic casing 52 and the strip member 51 are molded together to integrally form an elastic housing 50 that completely wraps the neckband headset.

Figure 5:
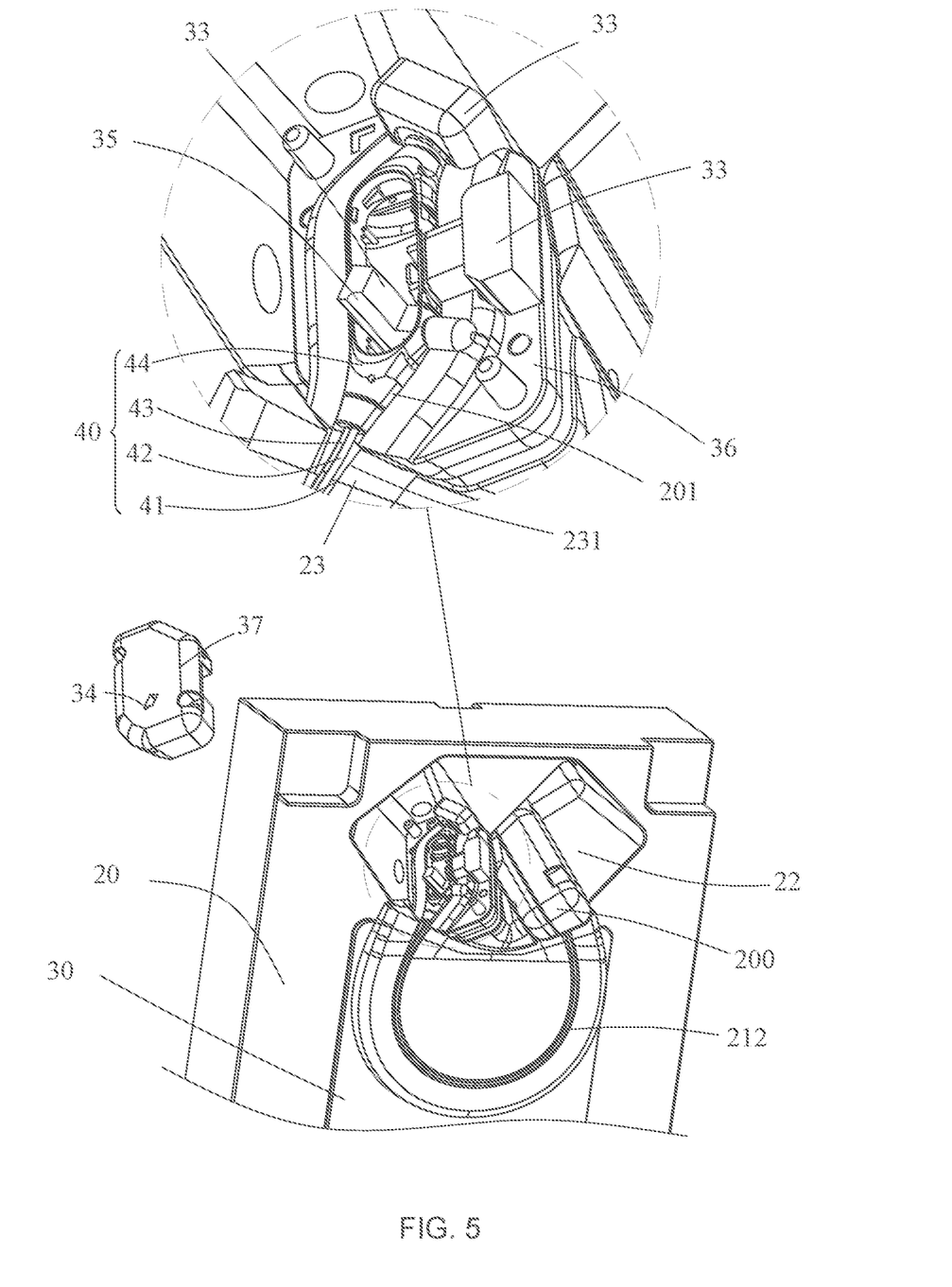
FIG. 5 is a structure diagram showing the control end injection mold installed on the lower mold core according to the present invention.
Figure 6:
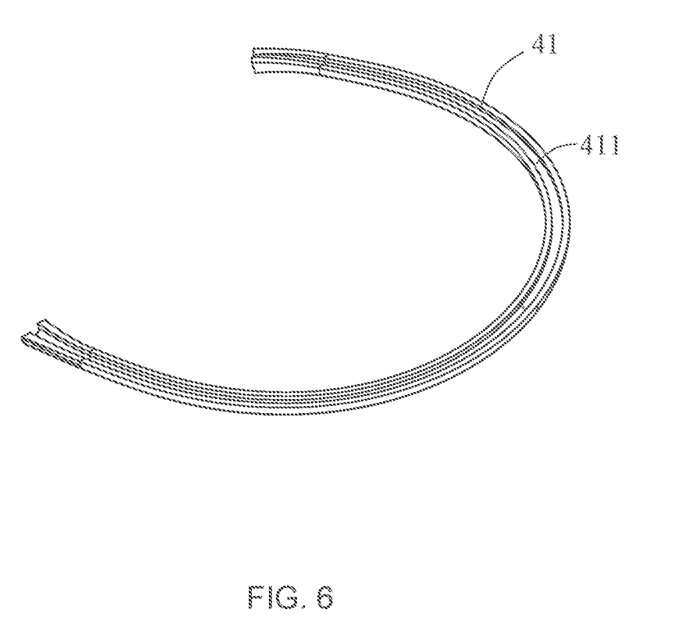
FIG. 6 is a structure diagram of the supporting member according to the present invention.

Referring to FIG. 5, the control end injection mold 200 includes a first mold 37, a second mold 36 mated with the first mold 37 to form the control end injection cavity 201, and a mold insert 33 installed in the control end injection cavity 201 and corresponding to an opening of an insulation shell of a headset controller. A first hole 34 for allowing a headset wire to pass through is formed on the first mold 37, and a second hole 35 is formed on one of the mold inserts 33 and extended to the first hole 34 to communicate with the first hole 34.

Specifically, before molding the elastic housing 50, the end of the headset wire 43 is guided to the control end injection molding mold 200 through the second hole 35 and the first hole 34.

Preferably, the elastic housing is made of silicone or silicone rubber, and the rotary injection mold 100 is an LSR (liquid silicone rubber) injection mold.

Referring to FIG. 5, a spacer wall 23 is formed between the control end injection cavity 201 and the secondary injection cavity 212, the neck channel 231 is formed on the spacer wall 23, and the spacer wall 23 is connected with the half-ring molding channel 32 of the second injection position 212 and the control end injection cavity 201.

Figure 3:
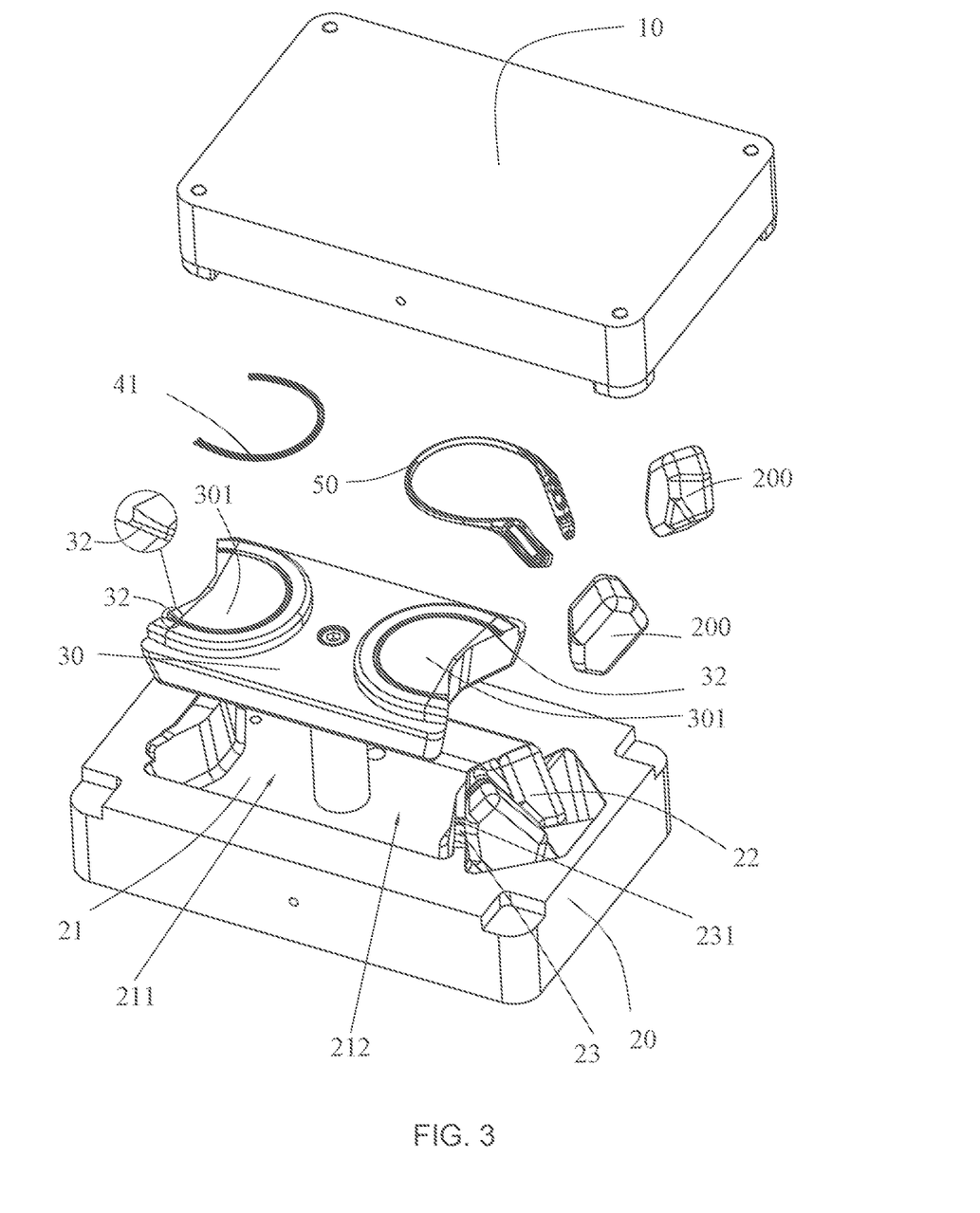
FIG. 3 is an exploded perspective view of the injection molding core according to the present invention.
Figure 4:
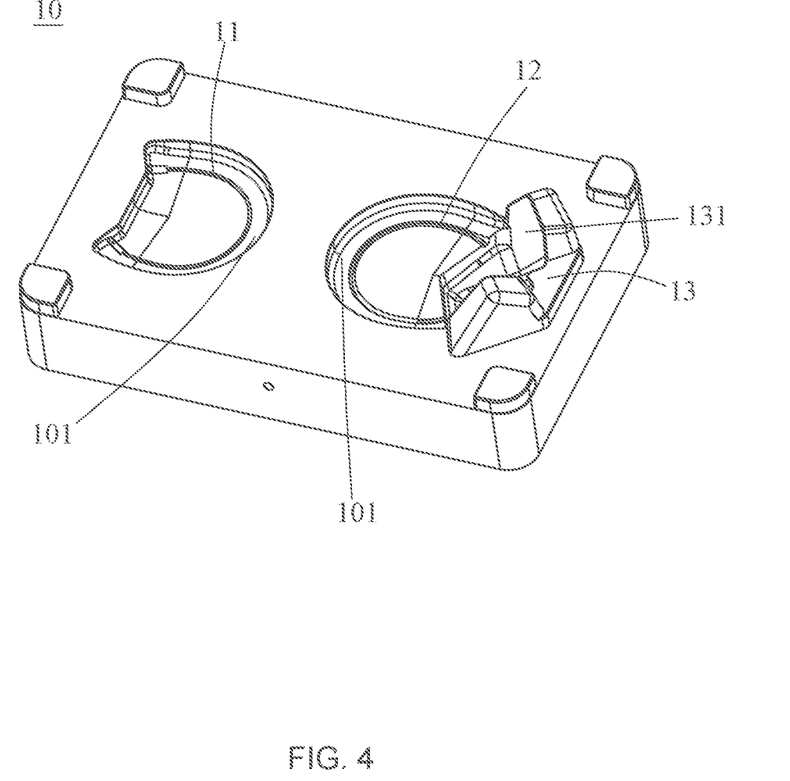
FIG. 4 is a perspective view of the upper mold core according to the present invention.

Referring to FIGS. 3-4, the rotary mold core 30 is provided with two positioning tables 301 symmetrically with the rotation axis 31, the two half-ring molding channels 32 are formed on the two positioning tables 301 respectively. The upper mold core 10 is provided with two positioning grooves 101 matched with the positioning tables 301 respectively, and the first upper mold core 11 and the second upper mold core 12 are respectively formed in the two positioning grooves 101.

Figure 2:
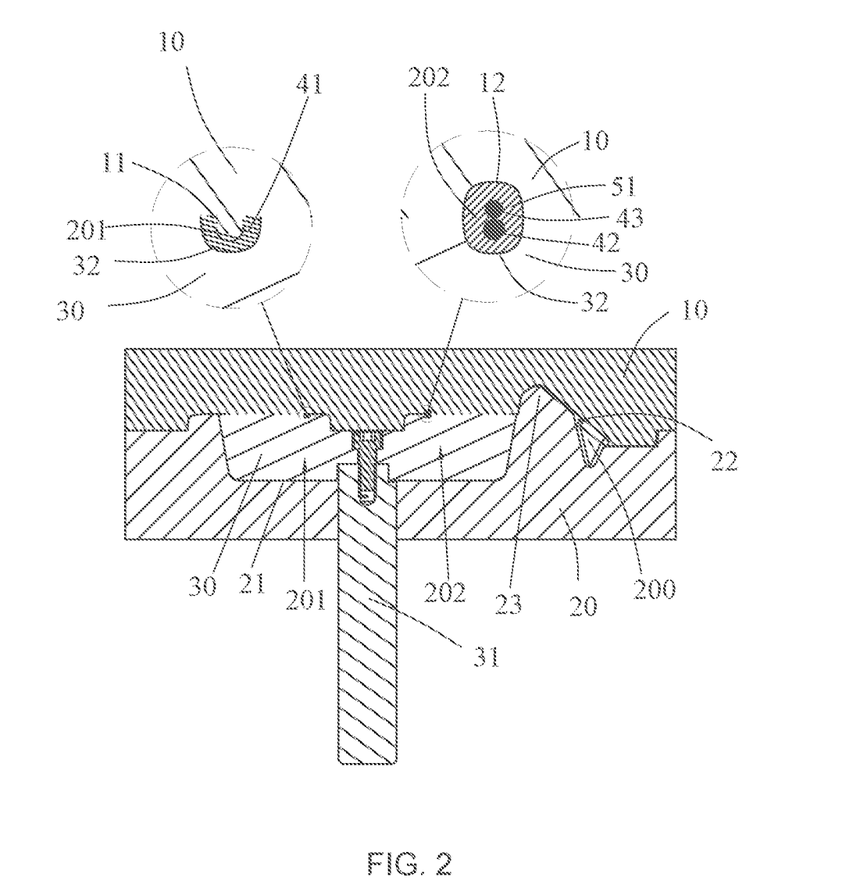
FIG. 2 is a sectional view of an injection mold core according to the present invention.

Referring to FIG. 2 and FIG. 4, the first upper mold core 11 is a half-ring protrusion 11 corresponding to the shape of the half-ring molding channel 32, and the cross-section of the half-ring protrusion 11 is semi-circular, and the diameter length of the cross-section of the half-ring protrusion 11 is less than the diameter length of the cross-section of the half-ring molding channel 32. The second upper mold core 12 is a molding channel 12 with the same shape and size as the half-ring molding channel 32.

Referring to FIG. 4, the upper mold core 10 is further provided with a positioning cavity 13 corresponding to the position of the control end installation cavity 22, and a positioning block 131 is formed in the positioning cavity 13 to position the two control end injection molds 200.

Referring to FIG. 3, the rotary mold core 30 can be lifted or lowered relative to the main installation cavity 21 to detach from or enter the main installation cavity 21. Preferably, the main installation cavity 21 is a non-circular cavity, more preferably, is an elongated cavity.

Figure 1:
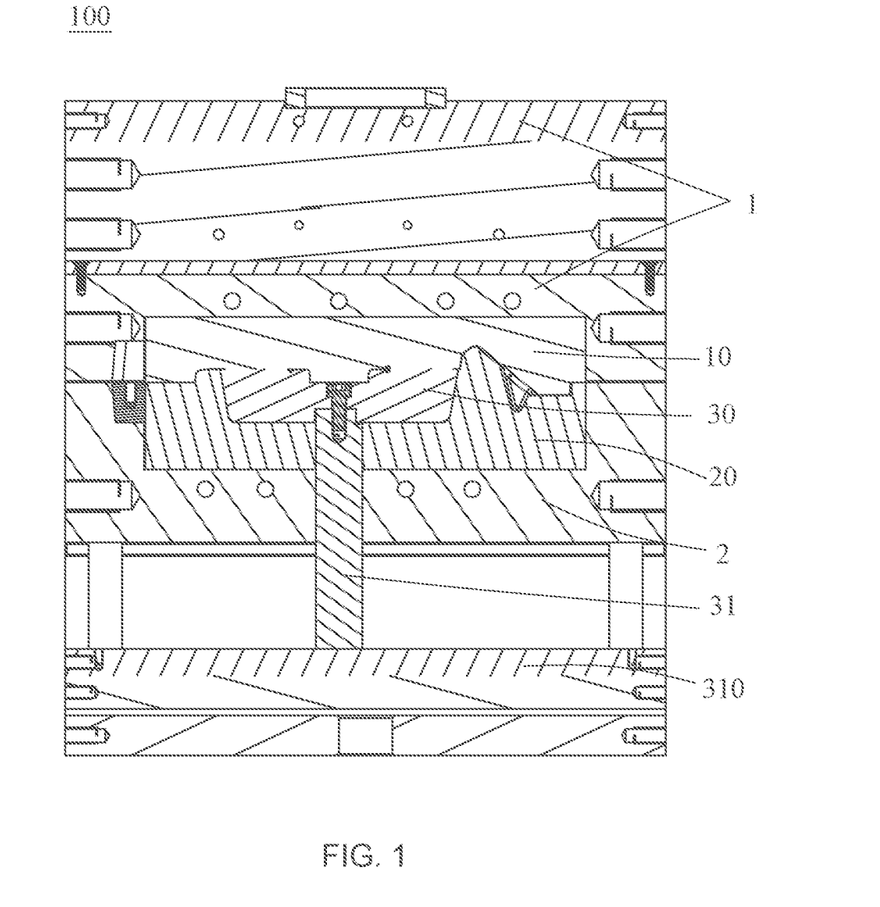
FIG. 1 is a sectional view of a rotary injection mold according to one embodiment of the present invention.

Referring to FIG. 1, the rotary injection mold 100 further includes a driving plate 310 connected with a rotating shaft 31 of the rotary mold core 30 and an actuator (not shown) to drive the driving plate 310 to lift or lower. When the rotary mold core 30 needs to be rotated, a control button is pressed to actuate the actuator to lift the driving plate 310, until the rotary mold core 30 is detached from the lower mold core 20, and then the rotary mold core 30 is manually or electrically rotated to 180 degrees, and then the control button is pressed again to actuate the actuator to lower the driving plate 310, until the rotary mold core 30 enters the main installation cavity 21 of the upper mold core 20.

Figure 7:
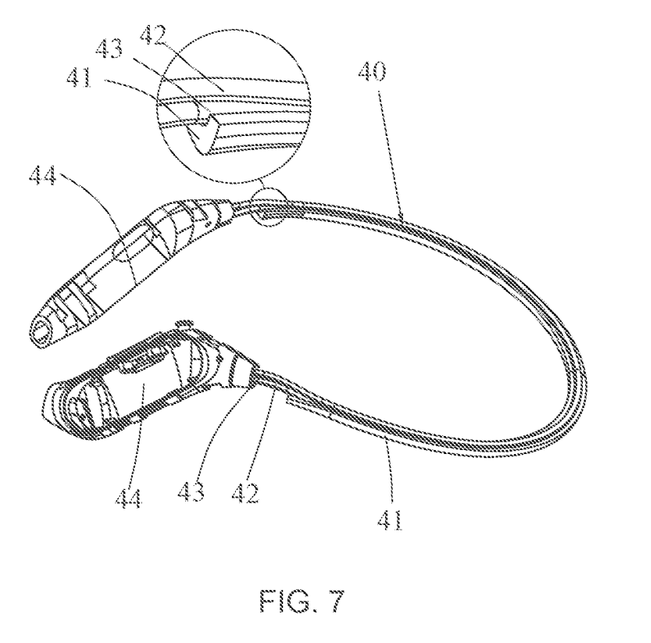
FIG. 7 is a structure diagram of the wrapped body according to the present invention.
Figure 8:
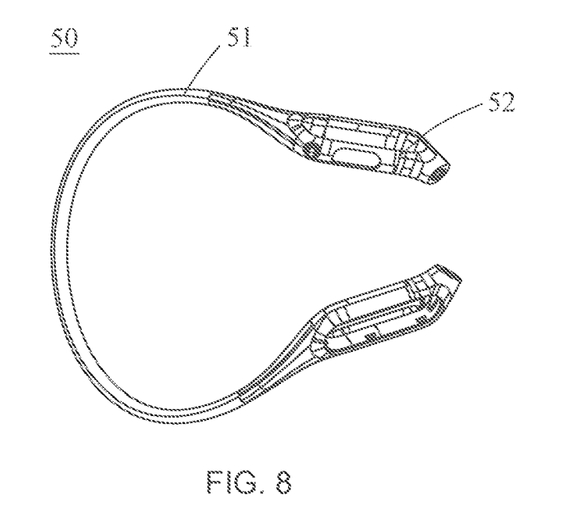
FIG. 8 is a structure diagram of the neckband headset with an elastic housing wrapped according to the present invention.

The present invention further discloses a manufacturing method for a neckband headset by using the rotary injection mold 100 mentioned above. The rotary mold core 30 is mounted in the main installation cavity 21. The method includes the following steps:

(1) closing the upper mold 1 and the lower mold 2, and injecting and molding in the primary injection cavity 201 to form the supporting member 41 for supporting a neck of the neckband headset;

(2) splitting the upper mold 1 and the lower mold 2;

(3) rotating the rotary mold core 30 and repositioning the rotary mold core 30 into the lower mold core 20 so that the half-ring molding channel 32 at the first injection position 211 is rotated and positioned to the second injection position 212, half-ring molding channel 32 at the second injection position 212 is rotated and positioned to the first injection position 211, and the supporting member 41 then moves to the second injection position 212;

(4) assembling a shaping strip 42, a headset wire 43, together with two insulation shells 44 of headset controller to form a wrapped body 40, with the two insulation shells 44 of headset controller being installed at both ends of the headset wire 43;

(5) inserting the headset wire 43 connected with the shaping strip 42 into the half-ring supporting area 411 of the supporting member 41 at the second injection position 212, installing the two insulation shells 44 of headset controller by using the control end injection mold 200, and guiding the ends of the headset wire 43 out of the control end injection mold 200 through the second and the first holes 35, 34; and then installing the control end injection mold 200 equipped with the insulation shells 44 in the control end installation cavity 22;

(6) closing the upper mold 1 and the lower mold 2, injecting and molding in the secondary injection cavity 202 and the control end injection cavity 201, so as to integrally form an elastic housing 50 wrapping the wrapped body by one-time injection, wherein the elastic housing 50 includes the supporting member 41, the strip member 51 wrapping the neck of the neckband headset, and the control end elastic casing 52 integrally connected with the strip member 51 and the supporting member 41 and wrapping the headset controller; at the same time, the supporting member 41 is injected and molded in the primary injection cavity 201;

(7) splitting the upper mold 1 and the lower mold 2 to obtain a neckband headset wrapped by the elastic housing 50.

In Step (6), at the same time of injecting in the secondary injection cavity 202, the supporting member 41 was injected and molded in the primary injection cavity 201, that is, in the non-first operations, Step (6) and Step (1) are carried out simultaneously, the primary injection and the second injection may be carried out simultaneously in the present invention, which improve the manufacturing efficiency.

Steps (3)-(7) may be repeated until the desired amount of product is processed.

Referring to FIG. 7, in this embodiment, the shaping strip 42 may include a nickel-titanium memory wire, or other memory metals or other materials that may be shaped. When assembling the shaping strip 42 and the headset wire 43, the size of the nickel-titanium memory wire is detected and controlled by a fixture first to meet the requirement. Then, the nickel-titanium memory wire is put into the mold to mold the ends of the wire, so as to form the shaping strip 42 with the specified shape whose size is detected and controlled by the fixture. Then, the headset wire 43 is put into a dispensing fixture to be dispensed on its surface, after that, the shaping strip 42 is placed above the headset wire 43, so that the headset wire 43 and the shaping strip 42 are fixed together by glue, or by other manners. In another embodiment, it's unnecessary to fix the headset wire 43 and the shaping strip 42 separately, instead, the unfixed headset wire 43 and shaping strip 42 are directly placed in the hollow area of the supporting member 41. Furthermore, during the preparation of the wrapped body 40, the two insulation shells 44 of the headset controller are fixed together with the headset wire 43 and the shaping strip 42 by using pins or screws, and then the headset wire 43 and the shaping strip 42 (namely the neckband) installed on the insulation shell 44 are installed in the supporting member 41.

In such a way, an integrated elastic housing is molded, to realize the integrated wrapping of the neckband headset, therefore the neckband headset according to the present invention has good waterproof and sweat resistant effect. Specifically, the secondary injection cavity 202 is respectively connected to the two control end injection molds 200.

In the present embodiment, the elastic housing may be made of silicone or silicone rubber, and the injection mold may be an LSR (liquid silicone rubber) injection mold. Of course, the elastic housing may be made of other elastic materials, and the injection mold may be other types.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A rotary injection mold for an elastic housing of a neckband headset, comprising an upper mold core and a lower mold core,
    wherein the lower mold core is provided with a main installation cavity and a control end installation cavity, the main installation cavity is installed with a rotary mold core, the rotary mold core is provided with two half-ring molding channels which are symmetrical with a rotation axis thereof, and the two half-ring molding channels are rotatable and positioned between a first injection position and a second injection position;
    the upper mold core is provided with a first upper mold core and a second upper mold core; wherein when the upper mold core and the lower mold core are closed, a primary injection cavity is formed between the first upper mold core and the half-ring molding channel at the first injection position, by which a supporting member supporting a neck of the neckband headset is molded; a secondary injection cavity is formed between the second upper mold core and the half-ring molding channel at the second injection position, by which a strip member wrapping the neck of the neckband headset is molded;
    the control end installation cavity is configured to install two control end injection molds, and each of the control end injection cavities is respectively provided with a control end injection cavity by which a control end elastic casing for wrapping an insulation shell of a headset controller is molded; two control end injection cavities are hermetically communicated with the secondary injection cavity through a neck channel, so that the control end elastic casing and the strip member are molded together to integrally form an elastic housing that completely wraps the neckband headset.

2. The rotary injection mold according to claim 1, wherein the control end injection mold comprises a first mold, a second mold mated with the first mold to form the control end injection cavity, and an mold insert installed in the control end injection cavity and corresponding to an opening of the insulation shell of a headset controller;
    a first hole for allowing a headset wire to pass through is formed on the first mold, and a second hole is formed on the mold insert and communicated with the first hole.

3. The rotary injection mold according to claim 1, wherein the elastic housing is made of silicone or silicone rubber, and the rotary injection mold is a liquid silicone rubber injection mold.

4. The rotary injection mold according to claim 1, wherein a spacer wall is formed between the control end injection cavity and the secondary injection cavity, the neck channel is formed on the spacer wall, and the spacer wall is connected with the half-ring molding channel at the second injection position and the control end injection cavity.

5. The rotary injection mold according to claim 1, wherein the rotary mold core is provided with two positioning tables which are symmetrical with the rotation axis, and the two half-ring molding channels are formed on the two positioning tables respectively; the upper mold core is provided with two positioning grooves matched with the positioning tables respectively, and the first upper mold core and the second upper mold core are respectively formed in the two positioning grooves.

6. The rotary injection mold according to claim 1, wherein the first upper mold core is a half-ring protrusion corresponding to a shape of the half-ring molding channel, and a cross-section of the half-ring protrusion is semi-circular, and a diameter length of the cross-section of the half-ring protrusion is less than a diameter length of a cross-section of the half-ring molding channel; and the second upper mold core is a molding channel shaped and sized same as the half-ring molding channel.

7. The rotary injection mold according to claim 1, wherein the upper mold core is further provided with a positioning cavity corresponding to a position of the control end installation cavity, and a positioning block is formed in the positioning cavity to position the two control end injection molds.

8. The rotary injection mold according to claim 1, wherein the rotary mold core is configured to be lifted or lowered relative to the main installation cavity to detach from or enter the main installation cavity, and the main installation cavity is a non-circular cavity.

9. The rotary injection mold according to claim 8, further comprising a driving plate connected with a rotating shaft of the rotary mold core and an actuator to drive the driving plate.

10. A manufacturing method of a neckband headset with an elastic housing using the rotary injection mold according to claim 1, comprising:
    installing the rotary mold core in the main installation cavity;
    closing the upper mold and the lower mold, and injecting and molding in the primary injection cavity to form a supporting member for supporting a neck of the neckband headset;
    splitting the upper mold and the lower mold, rotating and repositioning the rotary mold core into the lower mold core so that the half-ring molding channel at the first injection position is rotated and positioned to the second injection position, the half-ring molding channel at the second injection position is rotated and positioned to the first injection position, and the supporting member then moves to the second injection position;
    assembling a shaping strip, a headset wire, together with two insulation shells of headset controller to form a wrapped body, with the two insulation shells of headset controller being installed at both ends of the headset wire;
    installing the headset wire connected with the shaping strip into a half-ring supporting area of the supporting member at the second injection position, installing the two insulation shells of headset controller by using the control end injection mold, and installing the control end injection mold equipped with the insulation shells in the control end installation cavity; and closing the upper mold and the lower mold, injecting and molding in the secondary injection cavity and the control end injection cavity, so as to integrally form an elastic housing wrapping the wrapped body by one-time injection, the elastic housing comprising the supporting member, the strip member wrapping the neck of the neckband headset, and the control end elastic casing integrally connected with the strip member and the supporting member and wrapping the headset controller.

11. An injection mold for an elastic housing of a neckband headset, comprising:
a first injection mold, having a first upper mold core and a first lower mold core, and the first lower molding core being provided with a first mold core installation cavity;
a second injection mold, having a second upper mold core and a second lower mold core, and the second lower molding core being provided with a second mold core installation cavity; and
a rotary mold core, mated with the first mold core installation cavity and the second mold core installation cavity, and provided with a molding channel that is extending transversely and has an upper opening;
wherein when the rotary mold core is detachably installed in the first mold core installation cavity, the first upper mold is mated with the molding channel to define a primary injection cavity where a support supporting a neck of the neckband headset is molded;
when the rotary mold core is detachably installed in the second mold core installation cavity, the second upper mold is mated with the molding channel to define a secondary injection cavity where a strip member wrapping the neck of the neckband headset is molded.

12. The injection mold according to claim 11, wherein the second injection mold is further provided with two control end injection molds, each of which is provided with a control end injection cavity communicated with the second mold core installation cavity for molding a control end elastic casing wrapping an insulation shell of a headset controller; when the rotary mold core is detachably installed in the second mold core installation cavity and mated with the second upper mold to define the secondary injection cavity, the secondary injection cavity is hermetically communicated with the control end injection cavity.

13. The injection mold according to claim 12, wherein the secondary injection cavity of the second injection mold is respectively connected to the two control end injection molds; each of the control end injection molds comprises a first mold, a second mold mated with the first mold to form the control end injection cavity, and an mold insert installed in the control end injection cavity and corresponding to an opening of the insulation shell of a headset controller;
a first hole for allowing a headset wire to pass through is formed on the first mold, and a second hole is formed on the mold insert and communicated with the first hole.

14. The injection mold according to claim 12, wherein the two control end injection cavities are hermetically communicated with the secondary injection cavity through a neck channel.

15. The injection mold according to claim 14, wherein a spacer wall is formed between the control end injection cavity and the secondary injection cavity, the neck channel is formed on the spacer wall, and the spacer wall is connected with the secondary injection cavity and the control end injection molds.

16. The injection mold according to claim 11, wherein the elastic housing is made of silicone or silicone rubber, and the injection mold is a liquid silicone rubber injection mold.

17. The injection mold according to claim 11, wherein the first upper mold and the second upper mold are fixed together, the first lower mold and the second lower mold are fixed together, so that the first mold core installation cavity and the second mold core installation cavity are connected into a main installation cavity, the rotary mold core is installed in the main installation cavity in a rotatable manner, and the molding channel is rotatable and positioned between the first mold core installation cavity and the second mold core installation cavity.

18. The injection mold according to claim 17, wherein the rotary mold core is provided with two molding channels which are symmetrical with a rotation axis thereof, and the two molding channels are rotatable and positioned between the first mold core installation cavity and the second mold core installation cavity, one of the two molding channels is located in the first model installation cavity, another of the two molding channels is located in the second model installation cavity.

19. The injection mold according to claim 17, wherein the rotary mold core is configured to be lifted or lowered relative to the main installation cavity to detach from or enter the main installation cavity, and the main installation cavity is a non-circular cavity.

20. The injection mold according to claim 11, wherein the molding channel is a half-ring molding channel.

* * * * *